UNITED STATES PATENT OFFICE.

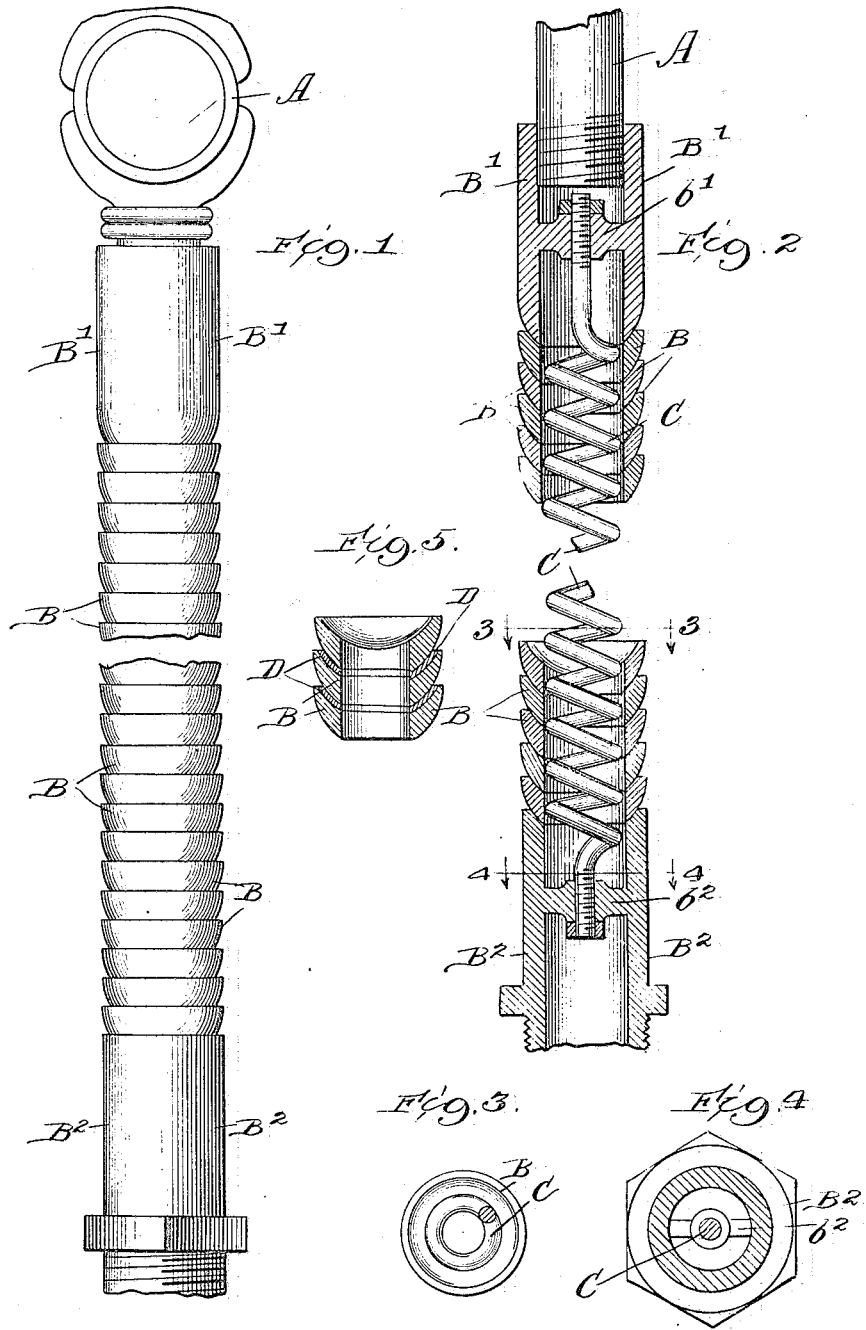

ARTHUR O'BRIEN, OF CHICAGO, ILLINOIS.

FLEXIBLE PIPE.

No. 809,977.　　　　　Specification of Letters Patent.　　　Patented Jan. 16, 1906.

Application filed February 2, 1903. Renewed September 23, 1905. Serial No. 279,851.

*To all whom it may concern:*

Be it known that I, ARTHUR O'BRIEN, a citizen of the United States, and a resident of the city of Chicago, in the county of Cook and State of Illinois, have invented certain new and useful Improvements in Flexible Pipes; and I do hereby declare that the following is a full, clear, and exact description thereof, reference being had to the accompanying drawings, and to the letters of reference marked thereon, which form a part of this specification.

This invention relates to improvements in flexible pipes, and more particularly to a pipe of metal or other rigid material so constructed as to provide a plurality of universal joints therein to enable the same to be bent upon itself, as desired.

The object of the invention is to provide a pipe of great flexibility and so constructed as to be air, gas, water, and steam tight.

The invention consists in the matters hereinafter described, and more fully pointed out and defined in the appended claims.

In the drawings, Figure 1 is a plan view of the pipe broken away in the center. Fig. 2 is a longitudinal section of the same. Fig. 3 is a section taken on line 3 3 of Fig. 2. Fig. 4 is a section taken on line 4 4 of Fig. 2. Fig. 5 is a detail of a slightly-modified construction.

In said drawings a section of the pipe is provided at the ends with fittings A for a train-pipe coupling, though obviously the pipe may be used for any purpose. The pipe is shown as constructed of a plurality of interfitting ball-and-socket members B, all of which on their engaging faces are spherically concave and convex, respectively, and are brought together to afford a tight joint, as shown in Fig. 2. Said sections may be constructed by stamping, casting, or in any desired manner and may be made to fit together exactly at slight expense. In the construction shown at each end of the portion elongated sections B' and B², respectively, are provided, each of which is provided with a transverse integral bar $b'$ $b^2$ therein having a central aperture extending therethrough adapted to receive the ends of a coiled spring C, which fits closely within the bore of the pipe and the ends of which are threaded to receive nuts, whereby the compression of the sections may be adjusted, as desired. Said sections B and B' may be of any desired shape and, if preferred, may be threaded either externally or internally to receive the fittings or connections to be used therewith. Obviously a very close fit is secured if the sections are accurately made as described, and the spring, which may be either internal or external, as preferred, acts to draw the same together under any desired tension.

If preferred and for certain purposes it may be useful to provide a packing of indurated fiber or the like in each of the joints between adjacent sections and indicated by D in Fig. 5, said indurated fiber may be secured in position in any desired manner.

The operation is as follows: The pipe-sections having been accurately fitted are placed in position either with the spring arranged therein or inclosing the sections, as preferred, and sufficient tension is produced therein to hold the sections very firmly in engagement with each other. Said spring fitting closely to the sections acts to guide and steady the same, causing any stress applied upon the sections of the pipe to be quite uniformly distributed over the entire length thereof and preventing localization of the stress.

Obviously the rounded and the concave surfaces of the sections become more closely fitted through the wear or use of the device, any movement thereof adding to the nicety of the fit.

Obviously many details of construction may be varied without departing from the principles of this invention.

I claim as my invention—

1. A flexible pipe comprising a plurality of sections each fitted together by means affording a universal joint and providing a central bore extending therethrough, and a spiral spring fitting closely to said sections and producing longitudinal compression of the pipe while holding the sections in operative relation.

2. A flexible pipe comprising a plurality of sections spherically concave on one side and complementally convex on the other, and provided with a central bore extending therethrough, said sections interfitting to provide a plurality of universal joints and a spiral spring fitted to said sections and producing longitudinal compression.

3. A flexible pipe comprising a plurality of sections spherically concave on one side and complementally convex on the other, and provided with a central bore extending therethrough, said sections interfitting to provide a plurality of universal joints and a spiral spring fitted to said sections and producing longitudinal compression, a bar integral with each section and affording connection for the ends of said spring.

4. A flexible pipe comprising a plurality of spherically-concave and spherically-convex members complemental each with the other, and adapted when brought together to afford universal joints and flexible means fitting closely thereto and acting to hold said sections in operative relation while producing longitudinal compression thereon.

5. A device of the class described comprising a plurality of interfitting sections together affording a plurality of universal liquid and fluid tight joints, flexible means fitting closely to said sections and acting to hold the same in operative relation and terminal fittings on said pipe adapted to afford connection with other parts of a pipe system.

In testimony whereof I have hereunto subscribed my name in the presence of two subscribing witnesses.

ARTHUR O'BRIEN

Witnesses:
  WELLIE W. WITHENBURY,
  A. C. ODELL.